United States Patent
Kurose et al.

(10) Patent No.: US 9,631,543 B2
(45) Date of Patent: Apr. 25, 2017

(54) EXHAUST PIPE SPHERICAL JOINT

(71) Applicant: OILES CORPORATION, Minato-ku, Tokyo (JP)

(72) Inventors: Kouhei Kurose, Fujisawa (JP); Eiji Satou, Fujisawa (JP); Yoshifumi Asano, Fujisawa (JP); Ryota Koibuchi, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 280 days.

(21) Appl. No.: 14/370,176

(22) PCT Filed: Dec. 18, 2012

(86) PCT No.: PCT/JP2012/008068
§ 371 (c)(1),
(2) Date: Jul. 1, 2014

(87) PCT Pub. No.: WO2013/105181
PCT Pub. Date: Jul. 18, 2013

(65) Prior Publication Data
US 2015/0008665 A1    Jan. 8, 2015

(30) Foreign Application Priority Data
Jan. 12, 2012  (JP) ................................. 2012-004337

(51) Int. Cl.
*F16L 23/00* (2006.01)
*F01N 13/18* (2010.01)
(Continued)

(52) U.S. Cl.
CPC ........ *F01N 13/1811* (2013.01); *C09K 3/1003* (2013.01); *F01N 13/1827* (2013.01);
(Continued)

(58) Field of Classification Search
USPC ........................................ 285/261, 368, 917
See application file for complete search history.

(56) References Cited

U.S. PATENT DOCUMENTS

| | | | | |
|---|---|---|---|---|
| 2,314,182 A | * | 3/1943 | Yeomans ................ | C02F 3/043 210/150 |
| 4,209,177 A | * | 6/1980 | Hall .................... | F01N 13/1805 277/608 |

(Continued)

FOREIGN PATENT DOCUMENTS

| | | |
|---|---|---|
| EP | 1 550 821 | 7/2005 |
| EP | 2 216 570 | 8/2010 |

(Continued)

OTHER PUBLICATIONS

Extended European Search Report issued in Application No. 12865163.5 dated Oct. 15, 2015.
(Continued)

*Primary Examiner* — Aaron Dunwoody
(74) *Attorney, Agent, or Firm* — Nixon & Vanderhye P.C.

(57) ABSTRACT

In an exhaust pipe spherical joint X, a spherical annular seal member 36 is fitted and fixed to a pipe end portion 42, the spherical annular seal member 36 is seated by abutting against a flange 43, a flared portion 47 formed of an Fe—Cr base stainless steel and containing 17.00 to 19.00% by mass of Cr is secured to a downstream-side exhaust pipe 44, and an inner surface 48 of a concave spherical surface portion 45 is brought into slidable contact with a composite surface 40 in which a surface 38 constituted by a reinforcing member 5 and a surface 39 constituted by a solid lubricant are present in mixed form in an outer surface 37 of an outer layer 35 of the spherical annular seal member 36.

6 Claims, 6 Drawing Sheets

(51) Int. Cl.
*F16J 15/12* (2006.01)
*F16L 27/073* (2006.01)
*C09K 3/10* (2006.01)

(52) U.S. Cl.
CPC ........ *F01N 13/1855* (2013.01); *F16J 15/126* (2013.01); *F16L 27/073* (2013.01); *F01N 2450/24* (2013.01); *F01N 2530/04* (2013.01); *F01N 2530/20* (2013.01)

(56) References Cited

U.S. PATENT DOCUMENTS

| | | | | |
|---|---|---|---|---|
| 4,223,922 | A * | 9/1980 | Pape | F01N 13/1811 285/231 |
| 4,277,092 | A * | 7/1981 | Viers | F01N 13/1811 285/263 |
| 4,516,782 | A | 5/1985 | Usher | |
| 4,547,434 | A | 10/1985 | Sumiyoshi et al. | |
| 4,601,476 | A * | 7/1986 | Usher | F01N 13/16 264/103 |
| 4,607,851 | A * | 8/1986 | Usher | F01N 13/16 264/258 |
| 4,659,091 | A * | 4/1987 | Baasner | F01N 13/1811 264/257 |
| 4,762,330 | A * | 8/1988 | Lonne | F01N 13/16 277/627 |
| 4,871,181 | A * | 10/1989 | Usher | F01N 13/1811 277/627 |
| 4,902,024 | A * | 2/1990 | Takenoshita | F01N 13/1827 156/192 |
| 4,955,218 | A * | 9/1990 | Brandener | F01N 13/16 264/257 |
| 5,040,805 | A * | 8/1991 | Ozora | F01N 13/1811 277/621 |
| 5,462,291 | A * | 10/1995 | Maeda | F16J 15/126 277/507 |
| 5,499,825 | A * | 3/1996 | Maeda | F01N 13/16 277/626 |
| 5,779,282 | A * | 7/1998 | Ezze | F16L 27/04 285/261 |
| 5,836,624 | A * | 11/1998 | Brandener | F01N 13/1811 285/261 |
| 5,997,979 | A * | 12/1999 | Kashima | F16J 15/126 277/602 |
| 6,129,362 | A * | 10/2000 | Kashima | F01N 13/1811 277/627 |
| 6,152,453 | A * | 11/2000 | Kashima | F16J 15/126 277/404 |
| 9,347,562 | B2 * | 5/2016 | Shionoya | F16J 15/126 |
| 2004/0066007 | A1 * | 4/2004 | Kubota | F16L 27/073 277/608 |
| 2004/0135366 | A1 * | 7/2004 | Sasada | F16L 27/053 285/49 |
| 2004/0207162 | A1 * | 10/2004 | Kubota | F16J 15/126 277/650 |
| 2005/0258642 | A1 | 11/2005 | Brophy, III et al. | |
| 2006/0091616 | A1 * | 5/2006 | Kubota | C09K 3/10 277/627 |
| 2007/0257443 | A1 | 11/2007 | Kubota et al. | |
| 2008/0211195 | A1 * | 9/2008 | Miyamoto | F01N 13/16 277/608 |
| 2010/0253011 | A1 * | 10/2010 | Maeda | F01N 13/08 277/626 |

FOREIGN PATENT DOCUMENTS

| | | |
|---|---|---|
| GB | 2 271 398 A | 4/1994 |
| JP | 58-34230 | 2/1983 |
| JP | 6-123362 | 5/1994 |
| JP | 2003-97713 | 4/2003 |
| JP | 2003-97713 A | 4/2003 |
| JP | 2004-301261 | 10/2004 |
| JP | 2004/301261 A | 10/2004 |
| JP | 2005-127391 | 5/2005 |
| JP | 2005-127391 A | 5/2005 |
| JP | 2006-29369 | 2/2006 |
| JP | 2006-29369 A | 2/2006 |

OTHER PUBLICATIONS

Canadian Office Action issued in Application No. 2,859,749 dated Jul 10, 2015.
The Japan Iron and Steel Federation, Boiler—Netsu Kokankiyo Stainless Hagane Kokan JIS G3463 :2006, Japanese Standards Association, Jan. 20, 2006, pp. 4 to 5.
International Search Report in PCT/JP2012/008068 dated Mar. 12, 2013.
International Search Report for PCT/JP2012/008068 mailed Mar. 12, 2013.
The Japan Iron and Steel Federation, Boiler Netsu Kokankiyo Stainless Hagane Kokan JIS G 3463:2006, Japanese Standards Association, Jan. 20, 2006, pp. 4-5.

* cited by examiner

HORIZONTAL LENGTH

VERTICAL LENGTH

EXHAUST PIPE SPHERICAL JOINT

This application is the U.S. national phase of International Application No. PCT/JP2012/008068 filed 18 Dec. 2012 which designated the U.S. and claims priority to Japanese Patent Application No. JP 2012-004337 filed 12 Jan. 2012, the entire contents of each of which are hereby incorporated by reference.

TECHNICAL FIELD

The present invention relates to an exhaust pipe spherical joint for use in an automobile exhaust pipe.

BACKGROUND ART

Figure 17:
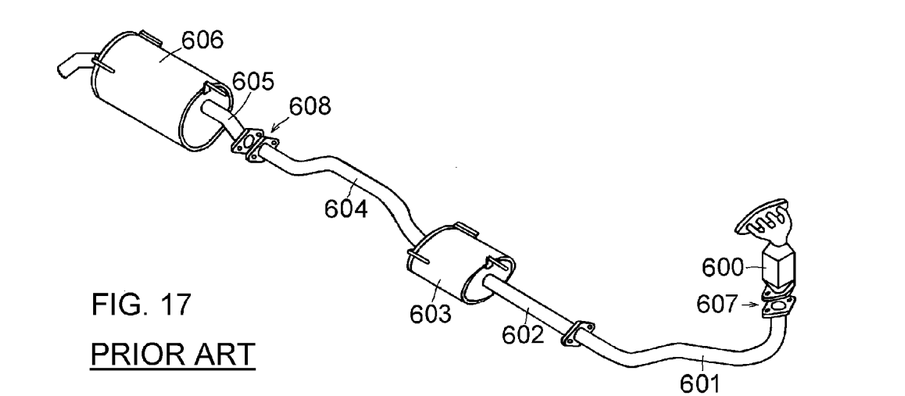
FIG. 17 is an explanatory diagram of an exhaust system of an engine.

As for exhaust gases of an automobile engine, in FIG. 17 which shows one example of an exhaust passage of an automobile engine, exhaust gases generated in the respective cylinders (not shown) of the engine are gathered in an exhaust manifold catalyst converter 600 and are sent to a sub muffler 603 through an exhaust pipe 601 and an exhaust pipe 602. The exhaust gases which passed through this sub muffler 603 are further sent to a muffler 606 through an exhaust pipe 604 and an exhaust pipe 605, and are released to the atmosphere through this muffler 606.

Exhaust system members such as these exhaust pipes 601 and 602 as well as 604 and 605, the sub muffler 603, and the muffler 606 are subjected to repeated stress owing to such as the roll behavior and vibration of the engine. Particularly in the case of a high-speed rotation and high-output engine, the stress applied to the exhaust system members becomes quite large. Accordingly, a fatigue failure can possibly occur in the exhaust system members, and the engine vibration can cause the exhaust system members to resonate, thereby deteriorating compartment quietness in some cases. To overcome these problems, a connecting portion 607 between the exhaust manifold catalyst converter 600 and the exhaust pipe 601 and a connecting portion 608 between the exhaust pipe 604 and the exhaust pipe 605 are movably connected by a vibration absorbing mechanism such as an exhaust pipe spherical joint or a bellows type exhaust pipe joint, whereby advantages are provided in that the stress is absorbed to which the exhaust system members are repeatedly subjected due to such as the roll behavior and vibration of the automobile engine, thereby preventing the fatigue failure and the like of these exhaust system members and overcoming the problem that the engine vibration causes the exhaust system members to resonate and deteriorates the quietness of the compartment interior.

PRIOR ART DOCUMENTS

Patent Documents

Patent Document 1: JP-A-1979-76759
Patent Document 2: JP-A-1983-34230
Patent Document 3: JP-A-1994-123362

SUMMARY OF THE INVENTION

Problems to be Solved by the Invention

As one example of the above-described vibration absorbing mechanism, it is possible to cite an exhaust pipe joint described in Patent Document 1 and a seal member which is used in that joint. The spherical pipe joint described in Patent Document 1 has advantages in that, in comparison with a bellows type joint, it makes it possible to attain a reduction in the manufacturing cost and excels in durability. However, the seal member which is incorporated in this spherical pipe joint is formed such that a heat-resistant material made from expanded graphite and a reinforcing member made from a metal wire net are compressed to fill meshes of the metal wire net of the reinforcing member with the heat-resistant material, and this heat-resistant material and the reinforcing member are thereby integrated in mixed form. As such, this seal member has the problem of occurrence of abnormal frictional noise due to the presence of the heat-resistant material at the partially convex spherical surface which comes into slidable contact with the surface of the mating member, in addition to the problem of leakage of exhaust gases through the seal member itself owing to such as the proportion of the reinforcing member to the heat-resistant material and the degree of compression of the heat-resistant material and the reinforcing member. For example, if the proportion of the reinforcing member to the heat-resistant material is large, and the degree of compression of the heat-resistant material is low, there are possibilities that initial leakage can occur due to a decline in the degree of sealing by the heat-resistant material with respect to infinitesimal passages (gaps) occurring around the reinforcing member, and that exhaust gases can leak in an early stage due to such as the oxidative wear of the heat-resistant material under high temperature. In addition, if the rate of exposure of the heat-resistant material with respect to the reinforcing member at the partially convex spherical surface is very large, the stick-slip phenomenon can occur, possibly causing the generation of abnormal frictional noise ascribable to that stick-slip phenomenon.

As seal members for overcoming the drawbacks of the above-described exhaust seal member, it is possible to cite seal members which are described in Patent Document 2 and Patent Document 3. Each of these seal members is formed such that a reinforcing member made from a metal wire net is wound together with a solid lubricant having heat resistance and arranged thereon in a layered manner, and a deformed and intertwined reinforcing member made from a metal wire net and a solid lubricant filled and held in the meshes of, and between fine metal wires of, the metal wire net of the reinforcing member are intermingled on the smooth surface of a preform thus obtained by compression forming that layered assembly.

As compared with the seal member described in Patent Document 1, since the reinforcing member made from the metal wire net and the solid lubricant are exposed in mixed form on a sliding surface thereof which is brought into slidable contact with the mating member, these seal members excel in capabilities in forming a solid lubricant film onto the surface of the mating member which is formed during sliding, and in cases where the solid lubricant film has been formed excessively on the surface of the mating member, the reinforcing member made from the metal wire net plays the role of scraping it off. Therefore, since direct contact with the graphite film which can occur in the seal member of Patent Document 1 described above is avoided, these seal members have the advantage in that the generation of abnormal frictional noise can be prevented as practically as possible even in the case where they are used by being incorporated in spherical pipe joints.

However, even with the spherical pipe joint incorporating the seal member having the above-described advantage, the solid lubricant film formed on the surface of the mating member is interposed on the frictional surface in the form of wear dust with an increase of friction between the seal member and the mating member. Particularly in a high-temperature region exceeding 300° C., this wear dust is interposed between the frictional surfaces in the form of oxides and scrapes off the solid lubricant film on the surface of the mating member, possibly resulting in a shift in the wear to that between metals constituted by the mating member and the reinforcing member made from the metal wire net in the seal member.

Normally, stainless steel wires having heat resistance is used as the reinforcing member made from the metal wire net for forming the seal member, and the mating member is also formed of stainless steel having heat resistance; therefore, in the friction between the just-mentioned metals the friction assumes the form of that between stainless steels, i.e., between the so-called "metals of similar composition," which often manifests in the form of the drawback of generation of abnormal frictional noise. In addition, in the friction between the seal member and the mating member, the surface of the seal member becomes a discontinuous surface (irregular surface) where the reinforcing member made from the metal wire net is exposed, and the surface of the mating member which is in friction with this discontinuous surface becomes high in the bearing strength, possibly causing damage such as dents in the surface of the mating member and thereby accelerating the wear of the surface of the mating member and the solid lubricant which is in friction with that surface.

As a result of conducting strenuous efforts in view of the above-described aspects, the present inventors found that, depending on the combination of the seal member and the mating member which are formed of specific stainless steels, it is possible to suppress the generation of abnormal frictional noise even in the friction between the stainless steels and to prevent as practically as possible causing damage such as dents in the surface of the mating member even in the friction of the mating member and the discontinuous surface of the seal member where the reinforcing member made from the metal wire net is exposed, consequently preventing as practically as possible the wear of the surface of the mating member and the seal member which is in friction with the surface of the mating member.

The present invention has been devised in view of the above-described finding, and its object is to provide an exhaust pipe spherical joint which is capable of preventing as practically as possible the generation of abnormal frictional noise, causing damage to the surface of the mating member, and the wear of the seal member, and of allowing relative angular displacement occurring in the exhaust pipe to be effected smoothly.

Means for Overcoming the Problems

In accordance with the present invention, there is provided an exhaust pipe spherical joint in which a spherical annular seal member is fitted and fixed to an outer peripheral surface of an upstream-side exhaust pipe connected to an engine side, the spherical annular seal member including a spherical annular base member defined by a cylindrical inner surface, a partially convex spherical surface, and annular end faces on large- and small-diameter sides of the partially convex spherical surface, and an outer layer which is formed integrally on the partially convex spherical surface of the spherical annular base member and in which a heat-resistant material containing expanded graphite, a solid lubricant, and a reinforcing member made from a metal wire net are compressed such that the solid lubricant and the heat-resistant material are filled in meshes of the metal wire net of the reinforcing member and the solid lubricant, the heat-resistant material, and the reinforcing member are integrated in mixed form, an outer surface in the outer layer of the spherical annular seal member in which a surface constituted by the reinforcing member and a surface constituted by the solid lubricant are exposed in mixed form being disposed in such a manner as to oppose the upstream-side exhaust pipe and being in slidable contact with an inner surface of a concave spherical surface portion of a flared portion of a downstream-side exhaust pipe connected to a muffler side, relative angular displacement occurring between the upstream-side exhaust pipe and the downstream-side exhaust pipe being adapted to be allowed by sliding contact between the outer surface of the outer layer and the inner surface of the concave spherical surface portion, wherein: the reinforcing member made from the metal wire net exposed on the outer surface of the outer layer of the spherical annular seal member is formed of an Fe—Cr—Ni base stainless steel wire containing at least 16.00 to 18.00% by mass of Cr and 12.00 to 15.00% by mass of Ni, and the concave spherical surface which is brought into slidable contact with the outer surface is formed of an Fe—Cr base stainless steel containing at least 17.00 to 19.00% by mass of Cr.

According to the exhaust pipe spherical joint in accordance with the present invention, as the reinforcing member made from the metal wire net exposed on the outer surface of the outer layer of the spherical annular seal member is formed of an Fe—Cr—Ni base stainless steel wire containing at least 16.00 to 18.00% by mass of Cr and 12.00 to 15.00% by mass of Ni, and the mating member which is brought into slidable contact with the spherical annular seal member is formed of an Fe—Cr base stainless steel containing at least 17.00 to 19.00% by mass of Cr, it is possible to suppress the generation of abnormal frictional noise even in the sliding friction between stainless steels, prevent as practically as possible causing damage to the surface of the mating member such as dents even in the sliding friction between the mating member and a discontinuous surface of the reinforcing member made from the metal wire net exposed on the outer surface of the outer layer of the spherical annular seal member, and smoothly allow relative angular displacement occurring in the exhaust pipe.

The reason that the above-described effects are obtained by adopting specific combinations of stainless steels for the mating member and the reinforcing member made from the metal wire net exposed on the outer surface of the outer layer of this spherical annular seal member has not been ascertained; however, since the degrees of the wear and damage of the mating member substantially fluctuate depending on the combination of relative amounts of the Cr content contained in the stainless steels for forming the respective ones of the reinforcing member of the outer layer and the mating member, it is conjectured that the effects obtained are attributable to the combination of an Fe—Cr—Ni base stainless steel wire and an Fe—Cr base stainless steel whose Cr contents are in a substantially identical region.

In the exhaust pipe spherical joint in accordance with the present invention, the reinforcing member made from the metal wire net exposed on the outer surface of the outer layer of the spherical annular seal member preferably further contains 0.030% or less by mass of C, 1.00% or less by mass of Si, 2.00% or less by mass of Mn, 0.045% or less by mass of P, 0.030% or less by mass of S, and 2.00 to 3.00% by mass of Mo.

In the exhaust pipe spherical joint in accordance with the present invention, the concave spherical surface portion of the flared portion of the downstream-side exhaust pipe preferably further contains 0.030% or less by mass of C, 1.00% or less by mass of Si, 1.00% or less by mass of Mn, 0.040% or less by mass of P, 0.030% or less by mass of S, and 0.40 to 0.80% by mass of Ti and Nb (the sum of Ti and Nb), and preferably still further contains 0.75 to 1.50% by mass of Mo and 0.020% or less by mass of N.

In the exhaust pipe spherical joint in accordance with the present invention, the spherical annular base member for forming the spherical annular seal member which is incorporated in the exhaust pipe spherical joint includes a reinforcing member made from a metal wire net and a heat-resistant material containing expanded graphite and compressed in such a manner as to fill the meshes of the metal wire net of this reinforcing member and to be formed integrally with the reinforcing member in mixed form.

Each of the heat-resistant materials for forming the spherical annular base member and the outer layer in the spherical annular seal member may further contain 1.0 to 16.0% by mass of a phosphate, and may still further contain 0.05 to 5.0% by mass of a phosphoric acid.

By using a heat-resistant material containing, in addition to expanded graphite, a phosphate or a phosphate and a phosphoric acid, it is possible to raise the working temperature of the exhaust pipe spherical joint.

In the exhaust pipe spherical joint in accordance with the present invention, the solid lubricant exposed on the outer surface of the outer layer of the spherical annular seal member may contain 23 to 57% by mass of a polytetrafluoroethylene resin or a hexagonal boron nitride, 5 to 15% by mass of hydrated alumina, and 33 to 67% by mass of a polytetrafluoroethylene resin.

The solid lubricant exposed on the outer surface of the outer layer of the spherical annular seal member is capable of lowering the sliding frictional resistance with the mating member and smoothly allowing relative angular displacement of the exhaust pipe.

Advantages of the Invention

According to the present invention, it is possible to provide an exhaust pipe spherical joint which is capable of suppressing the generation of abnormal frictional noise, of preventing as practically as possible causing damage to the surface of the mating member such as dents and indentations even in the sliding friction between the mating member and the discontinuous surface of the reinforcing member made from the metal wire net exposed on the outer surface of the outer layer of the spherical annular seal member, and of smoothly allowing relative angular displacement occurring in the exhaust pipe.

MODE FOR CARRYING OUT THE INVENTION

Next, a more detailed description will be given of the present invention and the mode for carrying it out on the basis of the preferred embodiments illustrated in the drawings. It should be noted that the present invention is not limited to these embodiments.

A description will be given of constituent materials of a spherical annular seal member which is incorporated in the exhaust pipe spherical joint and a method of manufacturing the spherical annular seal member.

<Expanded Graphite Sheet I and Manufacturing Method Thereof>

While concentrated sulfuric acid of a 98% concentration is being agitated, a 60% aqueous solution of hydrogen peroxide is added to it as an oxidizing agent, and this solution is used as a reaction solution. This reaction solution is cooled and kept at a temperature of 10° C., and natural flake graphite powder having a particle size of 30 to 80 meshes is added to the reaction solution to effect reaction for a predetermined time. After the reaction, acid-treated graphite powder is separated by suction filtration, and an operation is repeated twice in which the acid-treated graphite powder is agitated in water and is subjected to suction filtration, to thereby sufficiently remove the sulfuric acid content from the acid-treated graphite powder. Then, the acid-treated graphite powder with the sulfuric acid content sufficiently removed is dried in a drying furnace for a predetermined time, and this is used as an acid-treated graphite powder.

The above-described acid-treated graphite powder is subjected to heating (expansion) treatment for 1 to 10 seconds at temperatures of 960 to 1200° C. to produce cracked gas. The gaps between graphite layers are expanded by a gas pressure thereof to form expanded graphite particles (expansion rate: 240 to 300 times). These expanded graphite particles are fed to a twin roller apparatus adjusted to a desired roll nip and is subjected to roll forming, thereby fabricating an expanded graphite sheet I having a desired thickness.

<Expanded Graphite Sheet II and Manufacturing Method Thereof>

While acid-treated graphite powder obtained in a method similar to that for the above-described acid-treated graphite powder is being agitated, a solution in which an aqueous solution of, for example, aluminum primary phosphate [Al($H_2PO_4$)$_3$] of a 50% concentration as a phosphate is diluted with methanol is compounded with that acid-treated graphite powder by spraying, and is agitated uniformly to fabricate a wet mixture. This wet mixture is dried in a drying furnace for a predetermined time. Then, this dried mixture is subjected to heating (expansion) treatment for 1 to 10 seconds at temperatures of 950 to 1200° C. to produce cracked gas. The gaps between graphite layers are expanded by the gas pressure thereof to form expanded graphite particles (expansion rate: 240 to 300 times). In this expansion treatment process, water in the structural formula of aluminum primary phosphate is eliminated. These expanded graphite particles are fed to the twin roller apparatus adjusted to a desired roll nip and is subjected to roll forming, thereby fabricating an expanded graphite sheet II having a desired thickness.

<Expanded Graphite Sheet III and Manufacturing Method Thereof>

While acid-treated graphite powder obtained in a method similar to that for the above-described acid-treated graphite powder is being agitated, a solution in which an aqueous solution of, for instance, aluminum primary phosphate of a 50% concentration as a phosphate and an aqueous solution of, for instance, orthophosphoric acid ($H_3PO_4$) of a 84% concentration as a phosphoric acid are diluted with methanol is compounded with that acid-treated graphite powder by spraying, and is agitated uniformly to fabricate a wet mixture. This wet mixture is dried in a drying furnace for a predetermined time. Then, this dried mixture is subjected to heating (expansion) treatment for 1 to 10 seconds at temperatures of 950 to 1200° C. to produce cracked gas. The gaps between graphite layers are expanded by the gas pressure thereof to form expanded graphite particles (expansion rate: 240 to 300 times). In this expansion treatment process, water in the structural formula of aluminum primary phosphate is eliminated, and the orthophosphoric acid undergoes dehydration reaction to produce phosphorus pentoxide. These expanded graphite particles are fed to the twin roller apparatus adjusted to a desired roll nip and is subjected to roll forming, thereby fabricating an expanded graphite sheet III having a desired thickness.

In the expanded graphite sheet II thus fabricated, aluminum primary phosphate is preferably contained at a ratio of 1.0 to 16.0% by mass. In the expanded graphite sheet III, aluminum primary phosphate and phosphorus pentoxide are preferably contained at a ratio of 1.0 to 16.0% by mass and at a ratio of 0.05 to 5.0% by mass, respectively. This expanded graphite containing the phosphate or phosphate and phosphorus pentoxide permits use at, for instance, 600° C. or a high-temperature range exceeding 600° C. since the heat resistance of the expanded graphite itself is improved and the oxidation inhibiting action is imparted thereto. Here, as the phosphate, it is possible to use, in addition to the aforementioned aluminum primary phosphate, lithium primary phosphate (Li$H_2PO_4$), lithium secondary phosphate (Li$_2$HPO$_4$), calcium primary phosphate [Ca($H_2PO_4$)$_2$], calcium secondary phosphate (CaHPO$_4$), aluminum secondary phosphate [Al$_2$(HPO$_4$)$_3$], and the like. As the phosphoric acid, it is possible to use metaphosphoric acid (HPO$_3$), polyphosphoric acid, and the like, in addition to the aforementioned orthophosphoric acid.

In the above-described expanded graphite sheets I, II, and III, their density is 1.0 to 1.5 Mg/m$^3$, preferably 1.0 to 1.2 Mg/m$^3$, and their thickness is suitably 0.3 to 0.6 mm.

<Concerning Knitted Metal Wire Net>

A knitted metal wire net for a spherical annular base member in the spherical annular seal member is suitably formed by knitting using one or more fine metal wires including, as an iron-based wire, an austenitic or ferritic stainless steel wire, a low carbon steel wire (JIS G 3532), or a zinc-coated low carbon steel wire (JIS G 3547), or, as a copper-based wire, a copper-nickel alloy (cupro-nickel) wire, a copper-nickel-zinc alloy (nickel silver) wire, a brass wire, or a beryllium copper wire.

The knitted metal wire net for an outer layer in the spherical annular seal member is formed by knitting using one or more Fe—Cr—Ni base stainless steel wires containing 0.030% or less by mass of C, 1.00% or less by mass of Si, 2.00% or less by mass of Mn, 0.045% or less by mass of P, 0.030% or less by mass of S, 16.00 to 18.00% by mass of Cr, 12.00 to 15.00% by mass of Ni, and 2.00 to 3.00% by mass of Mo.

Figure 6:
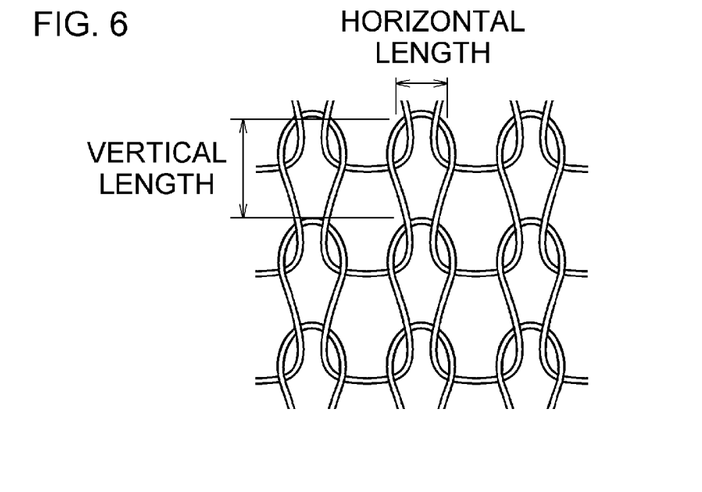
FIG. 6 is an explanatory plan view of meshes of a metal wire net of the reinforcing member.

As each of the knitted metal wire nets for the spherical annular base member and for the outer layer, each of a fine metal wire and a stainless steel wire whose diameter is 0.28 to 0.32 mm is suitably used. The mesh size, shown in FIG. 6, of this knitted metal wire net formed by each of the fine metal wire and the stainless steel wire of that diameter is preferably 3 to 6 mm long and 2 to 5 mm wide or thereabouts.

<Concerning Solid Lubricant>

The solid lubricant preferably contains 23 to 57% by mass of a polytetrafluoroethylene resin (hereinafter abbreviated as "PTFE") or a hexagonal boron nitride (hereinafter abbreviated as "h-BN"), 5 to 15% by mass of hydrated alumina, and 33 to 67% by mass of PTFE.

In the manufacturing process, the solid lubricant mentioned last above is used which is in the form of an aqueous dispersion in which h-BN and PTFE are dispersedly contained in an alumina sol in which hydrated alumina particles are dispersedly contained in water containing an acid as a dispersion medium and whose hydrogen ion concentration (pH) exhibits 2 to 3, the aqueous dispersion dispersedly containing as a solid content 30 to 50% by mass of a lubricating composition containing 23 to 57% by mass of h-BN, 33 to 67% by mass of PTFE, and 5 to 15% by mass of hydrated alumina. The h-BN powder and the PTFE powder for forming the aqueous dispersion are preferably as fine powders as possible, and fine powders with an average particle size of 10 μm or less, more preferably 0.5 μm or less, are suitably used as these powders.

The acid which is contained in water serving as a dispersion medium for the alumina sol in the aqueous dispersion acts as a deflocculant for stabilizing the alumina sol. As the acid, it is possible to cite inorganic acids such as hydrochloric acid, nitric acid, sulfuric acid, and amidesulfuric acid, but nitric acid, in particular, is preferable.

The hydrated alumina for forming the alumina sol in the aqueous dispersion is a compound which is expressed by a composition formula: $Al_2O_3 \cdot nH_2O$ (in the composition formula, $0<n<3$). In the compound, n is normally a number exceeding 0 (zero) and less than 3, preferably 0.5 to 2, more preferably 0.7 to 1.5 or thereabouts. As the hydrated alumina, it is possible to cite, for example, alumina monohydrate (aluminum hydroxide oxide) such as boehmite ($Al_2O_3 \cdot nH_2O$) and diaspore ($Al_2O_3 \cdot H_2O$), alumina trihydrate such as gibbsite ($Al_2O_3 \cdot 3H_2O$) and bayerite ($Al_2O_3 \cdot 3H_2O$), pseudoboehmite, and the like.

Next, referring to the drawings, a description will be given of a method of manufacturing a spherical annular seal member composed of the above-described constituent materials.

Figure 4:
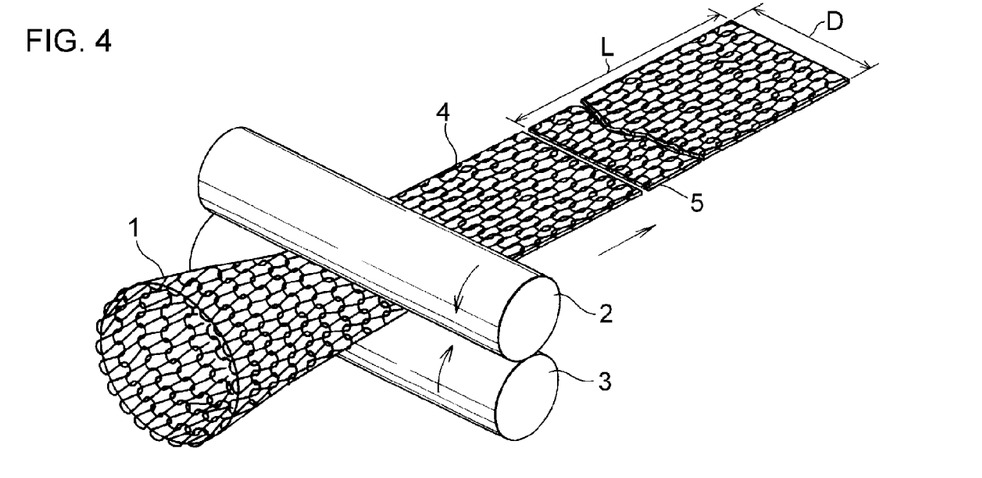
FIG. 4 is a perspective view explaining a method of forming a reinforcing member in the process of manufacturing the spherical annular seal member.

(First Process) As shown in FIG. 4, a hollow cylindrical knitted metal wire net 1, which is formed by knitting into a cylindrical shape the aforementioned fine metal wire having a diameter of 0.28 to 0.32 mm and constituted by an austenitic or ferritic stainless steel wire, a low carbon steel wire, or a zinc-coated low carbon steel wire, or a copper-nickel alloy wire, a copper-nickel-zinc alloy wire, a brass wire, or a beryllium copper wire, and whose mesh size is 3 to 6 mm long and 2 to 5 mm wide or thereabouts (see FIG. 6), is passed between rollers 2 and 3 so as to be pressurized, thereby fabricating a belt-shaped metal wire net 4 having a predetermined width D. A reinforcing member 5 for a spherical annular base member is then prepared by cutting the belt-shaped metal wire net 4 into a predetermined length.

Figure 5:
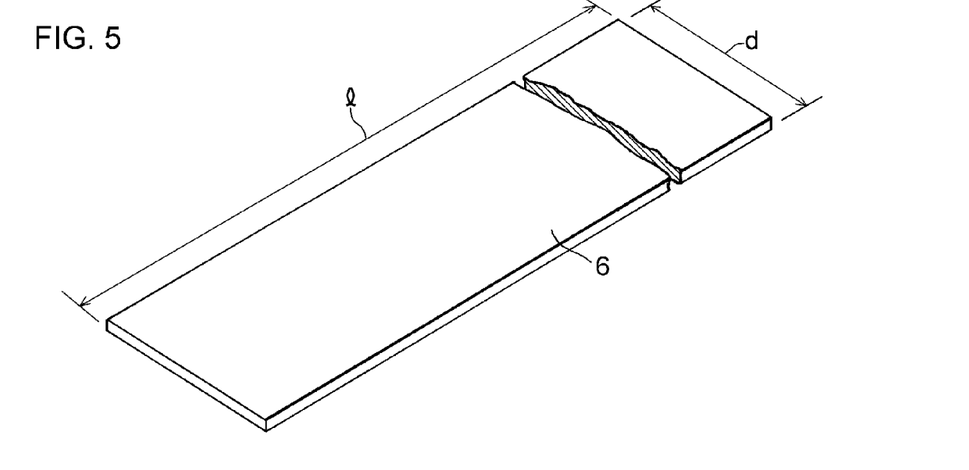
FIG. 5 is an explanatory perspective view of a heat-resistant material in the process of manufacturing the spherical annular seal member.

(Second Process) As shown in FIG. 5, an heat-resistant material 6 for the spherical annular base member (composed of one of the expanded graphite sheet I, the expanded graphite sheet II, and the expanded graphite sheet III) is prepared which has a width d of from $1.10 \times D$ to $2.1 \times D$ with respect to the width D of the reinforcing member 5, a length l of from $1.30 \times L$ to $2.7 \times L$ with respect to the length L of the reinforcing member 5, a density of 1.0 to 1.5 $Mg/m^3$, preferably 1.0 to 1.2 $Mg/m^3$, and a thickness of 0.30 to 0.60 mm.

Figure 7:
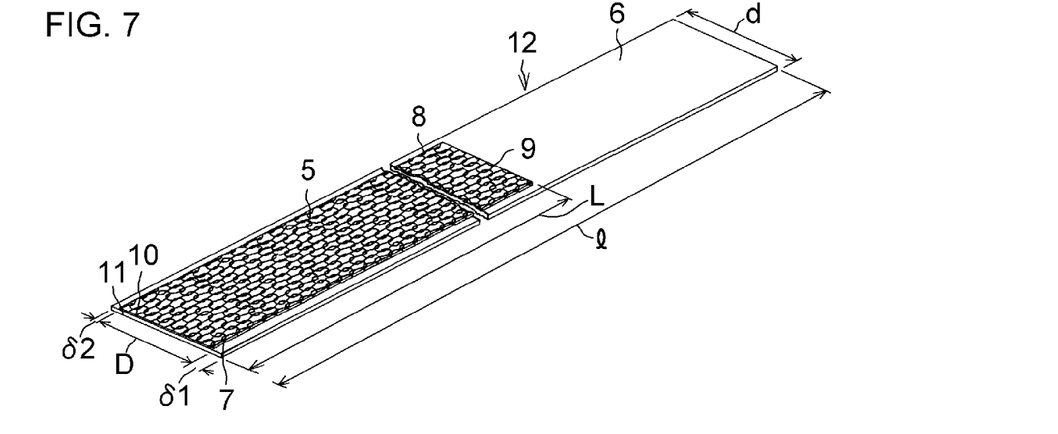
FIG. 7 is an explanatory perspective view of a superposed assembly in the process of manufacturing the spherical annular seal member.

(Third Process) A superposed assembly 12 in which the heat-resistant material 6 and the reinforcing member 5 are superposed one on top of the other is prepared as follows: To ensure that the expanded graphite of the heat-resistant material 6 is wholly exposed on an annular end face 32 on the large-diameter side of a partially convex spherical surface 31 and an annular end face 33 on the small-diameter side thereof in a below-described spherical annular seal member 36 (see FIGS. 1 and 2), as shown in FIG. 7, the heat-resistant material 6 is made to project in the widthwise direction by a $0.1 \times D$ to $0.3 \times D$ from one widthwise end 7 of the reinforcing member 5, which serves as the annular end face 32 on the large-diameter side of the partially convex spherical surface 31. Also, the amount of widthwise projection, δ1, of the heat-resistant material 6 from the end 7 is made greater than the amount of a widthwise projection thereof, δ2, from the other widthwise end 8 of the reinforcing member 5, which serves as the annular end face 33 on the small-diameter side of the partially convex spherical surface 31. Further, the heat-resistant material 6 is made to project in the longitudinal direction by $1.3 \times L$ to $2.7 \times L$ from one longitudinal end 9 of the reinforcing member 5, while the other longitudinal end 10 of the reinforcing member 5 and a longitudinal end 11 of the heat-resistant material 6 corresponding to that end 10 are matched.

Figure 8:
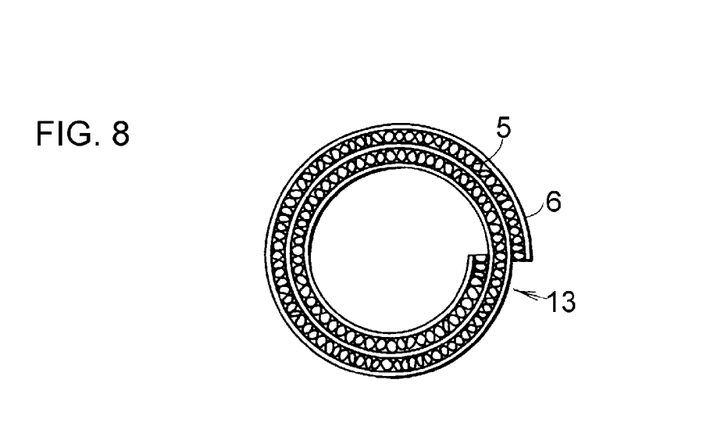
FIG. 8 is an explanatory plan view of a tubular base member in the process of manufacturing the spherical annular seal member.
Figure 9:
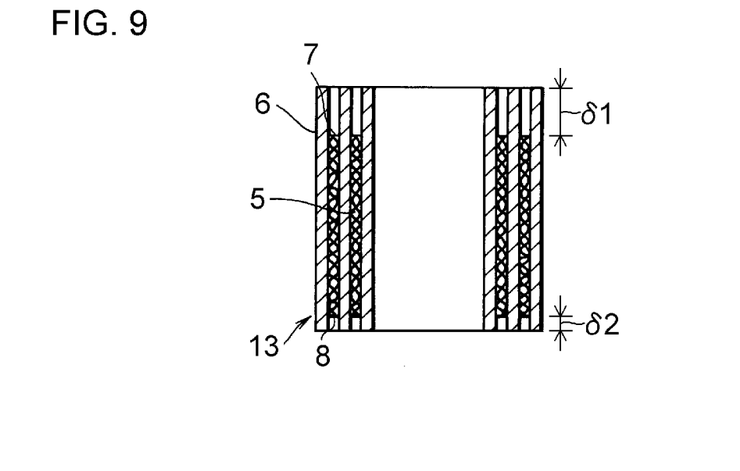
FIG. 9 is an explanatory vertical cross-sectional view of the tubular base member shown in FIG. 8.

(Fourth Process) As shown in FIG. 8, the superposed assembly 12 is convoluted around a hollow cylindrical core (not shown) with the heat-resistant material 6 placed on the inner side and such that heat-resistant material 6 is convoluted with one more turn, thereby forming a tubular base member 13 in which the heat-resistant material 6 is exposed on both inner and outer peripheral sides. As the heat-resistant material 6, one is prepared in advance which has a length l of from $1.3 \times L$ to $2.7 \times L$ with respect to the length L of the reinforcing member 5 so that the number of winding turns of the heat-resistant material 6 in the tubular base member 13 becomes greater than the number of winding turns of the reinforcing member 5. In the tubular base member 13, as shown in FIG. 9, the heat-resistant material 6 on one widthwise end side thereof projects in the widthwise direction by δ1 from the one end 7 of the reinforcing member 5, and the heat-resistant material 6 on other widthwise end side thereof projects in the widthwise direction by δ2 from the other end 8 of the reinforcing member 5.

Figure 10:
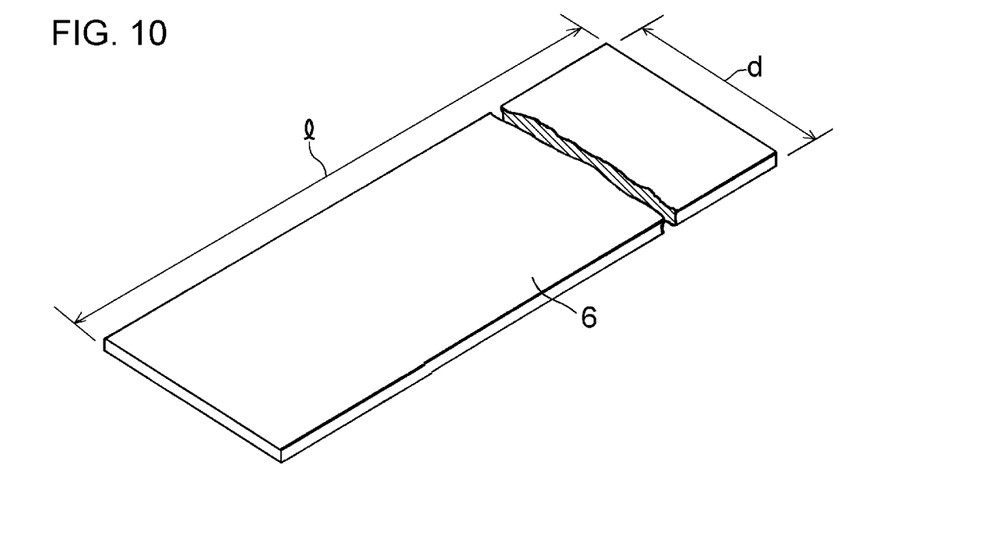
FIG. 10 is an explanatory perspective view of the heat-resistant material in the process of manufacturing the spherical annular seal member.

(Fifth Process) The heat-resistant material 6 for the outer layer, such as the one shown in FIG. 10, is separately prepared which is similar to the heat-resistant material 6 for the spherical annular base member, and yet which has a smaller width d than the width D of the reinforcing member 5 and a length l of such a measure that it can be wound around the tubular base member 13 by one turn.

(Sixth Process) An aqueous dispersion is prepared in which h-BN and PTFE are dispersedly contained in an alumina sol in which hydrated alumina particles are dispersedly contained in water serving as a dispersion medium containing nitric acid acting as a deflocculant and whose hydrogen ion concentration (pH) exhibits 2 to 3, the aqueous dispersion dispersedly containing as a solid content 30 to 50% by mass of a lubricating composition containing 23 to 57% by mass of h-BN, 33 to 67% by mass of PTFE, and 5 to 15% by mass of hydrated alumina.

Figure 11:
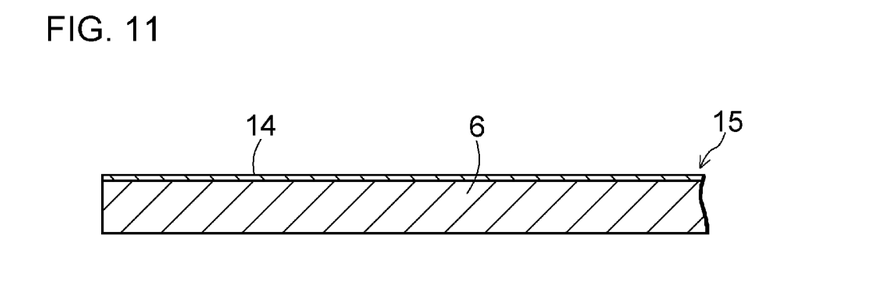
FIG. 11 is an explanatory cross-sectional view of a multilayer sheet having a coating layer in the process of manufacturing the spherical annular seal member.

An aqueous dispersion dispersedly containing as a solid content 30 to 50% by mass of a lubricating composition containing 23 to 57% by mass of h-BN, 33 to 67% by mass of PTFE, and 5 to 15% by mass of hydrated alumina is applied to one surface of the heat-resistant material 6 by means of brushing, roller coating, spraying, or the like, and this was dried to thereby fabricate a multilayer sheet 15 (see FIG. 11) on which a coating layer 14 of the solid lubricant consisting of the lubricating composition has been formed.

Figure 12:
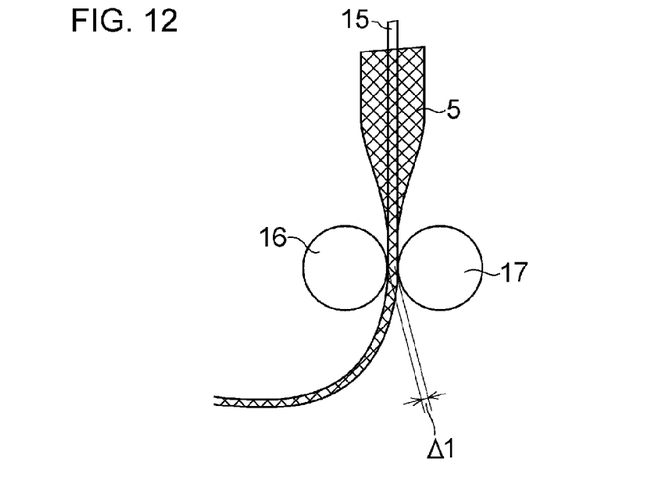
FIG. 12 is a diagram explaining a method of forming an outer layer forming member in the process of manufacturing the spherical annular seal member.
Figure 13:
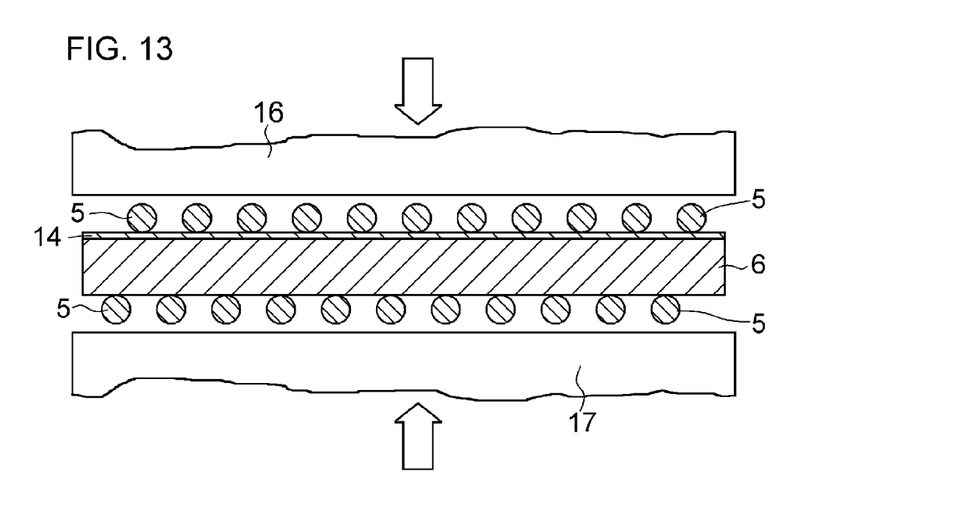
FIG. 13 is another diagram explaining the method of forming the outer layer forming member in the process of manufacturing the spherical annular seal member.
Figure 14:
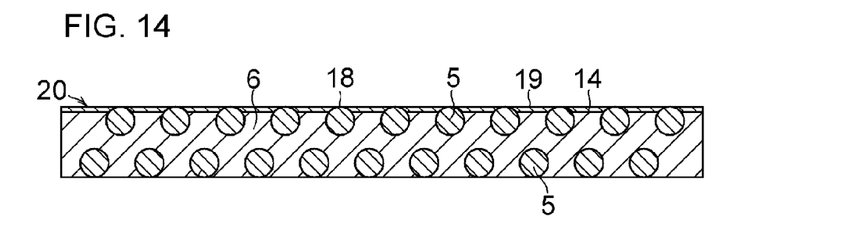
FIG. 14 is an explanatory vertical cross-sectional view of the outer layer forming member obtained by the forming method shown in FIG. 12 in the process of manufacturing the spherical annular seal member.

(Seventh Process) As shown in FIGS. 12 to 14, the multilayer sheet 15 having the coating layer 14 of the solid lubricant is continuously inserted into interior of the reinforcing member 5 for the outer layer which is made from the hollow cylindrical knitted metal wire net obtained by continuously knitting an Fe—Cr—Ni base stainless steel wire having a diameter of 0.28 to 0.32 mm and containing at least 16.00 to 18.00% or less by mass of Cr and 12.00 to 15.00% or less by mass of Ni by a knitting by a knitting machine (not shown). The reinforcing member 5 with the multilayer sheet 15 inserted therein is fed, starting with an insertion start end thereof, into a nip Δ1 (0.4 to 0.6 mm or thereabouts) between a pair of cylindrical rollers 16 and 17 each having a smooth cylindrical outer peripheral surface so as to be pressurized in the thicknesswise direction of the multilayer sheet 15 (see FIG. 13) and to be integrated. Thus, a flattened outer layer forming member 20 is fabricated in which the heat-resistant material 6 of the multilayer sheet 15 and the coating layer 14 of the solid lubricant of the multilayer sheet 15 are filled in the meshes of the metal wire net of the reinforcing member 5 for the outer layer, and a surface 18 constituted by the reinforcing member 5 for the outer layer and a surface 19 constituted by the solid lubricant are exposed in mixed form on the surface (see FIG. 14).

Figure 15:
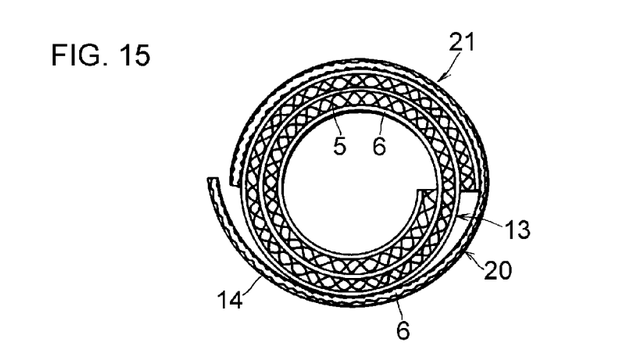
FIG. 15 is an explanatory plan view of a cylindrical preform in the process of manufacturing the spherical annular seal member.

(Eighth Process) The outer layer forming member 20 thus obtained is wound around the outer peripheral surface of the tubular base member 13 in a state in which the coating layer 14 is placed on the outer side, thereby fabricating a cylindrical preform 21, as shown in FIG. 15.

Figure 16:
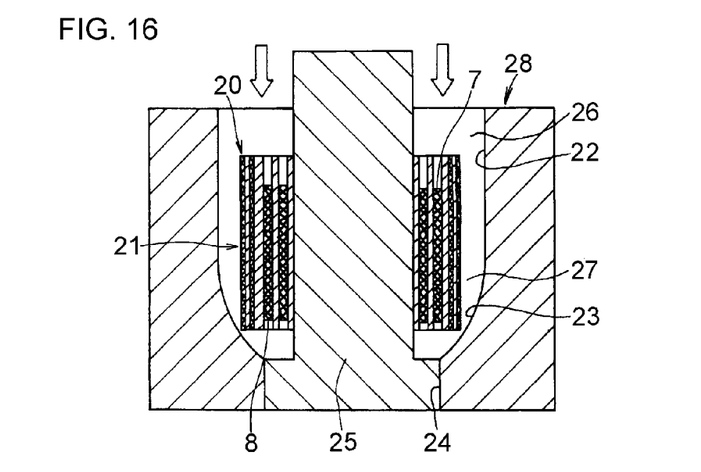
FIG. 16 is a cross-sectional view illustrating a state in which the cylindrical preform is inserted in a die in the process of manufacturing the spherical annular seal member.

(Ninth Process) A die 28 such as the one shown in FIG. 16 is prepared which has a cylindrical wall surface 22, a partially concave spherical wall surface 23 continuous to the cylindrical wall surface 22, and a through hole 24 continuous to the partially concave spherical wall surface 23 in the inner surface thereof, and in which a hollow cylindrical portion 26 and a spherical annular hollow portion 27 continuous to the hollow cylindrical portion 26 are formed inside it as a stepped core 25 is fittingly inserted in the through hole 24. Then, the cylindrical preform 21 is fitted over the stepped core 25 of the die 28.

The cylindrical preform 21 disposed in the hollow cylindrical portion 26 and the spherical annular hollow portion 27 of the die 28 is subjected to compression forming under a pressure of 98 to 294 N/mm$^2$ (1 to 3 tons/cm$^2$) in the direction of the core axis. Through this compression forming, the spherical annular seal member 36 is fabricated which includes: a spherical annular base member 34 having a through hole 29 in a central portion thereof and defined by a cylindrical inner surface 30, the partially convex spherical surface 31, and the annular end faces 32 and 33 on the large- and small-diameter sides of the partially convex spherical surface 31; and an outer layer 35 formed integrally on the partially convex spherical surface 31 of the spherical annular base member 34, as shown in FIGS. 1 and 2.

In the fabricated spherical annular seal member 36, the spherical annular base member 34 is constructed so as to be provided with structural integrity as the heat-resistant material 6 for the spherical annular base member and the reinforcing member 5 for the spherical annular base member are compressed to each other and intertwined with each other. In the outer layer 35, the heat-resistant material 6 for the outer layer, the solid lubricant constituted by the lubricating composition, and the reinforcing member 5 for the outer layer made from the metal wire net are compressed such that the solid lubricant and the heat-resistant material 6 for the outer layer are filled in the meshes of the metal wire net of that reinforcing member 5 for the outer layer, and the solid lubricant, the heat-resistant material 6, and the reinforcing member 5 are integrated in mixed form, an outer surface 37 of the outer layer 35 being thus formed into a composite surface 40 in which a surface 38 constituted by the reinforcing member 5 for the outer layer and a surface 39 constituted by the solid lubricant are present in mixed form.

Figure 1:
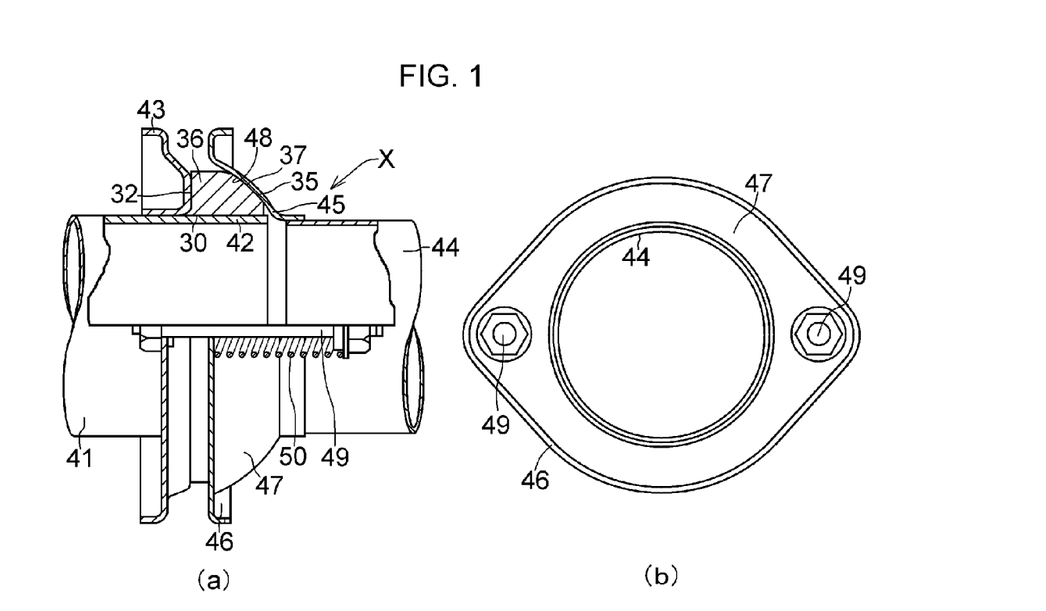
FIG. 1 illustrates a preferred embodiment of an exhaust pipe spherical joint in accordance with the present invention, in which part (a) is an explanatory cross-sectional view and part (b) is an explanatory right side elevational view.
Figure 2:
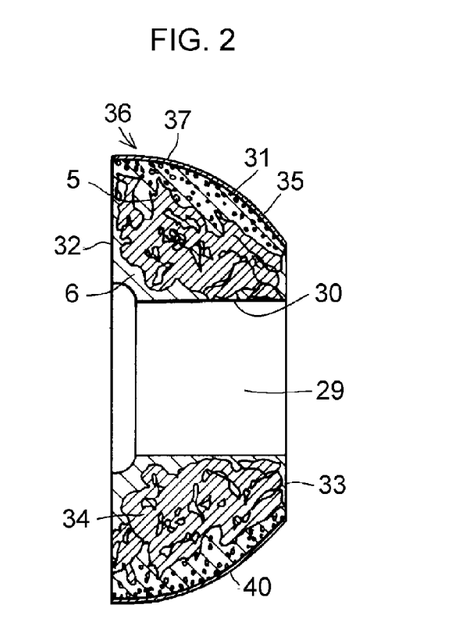
FIG. 2 is an explanatory cross-sectional view of a spherical annular seal member shown in FIG. 1.
Figure 3:
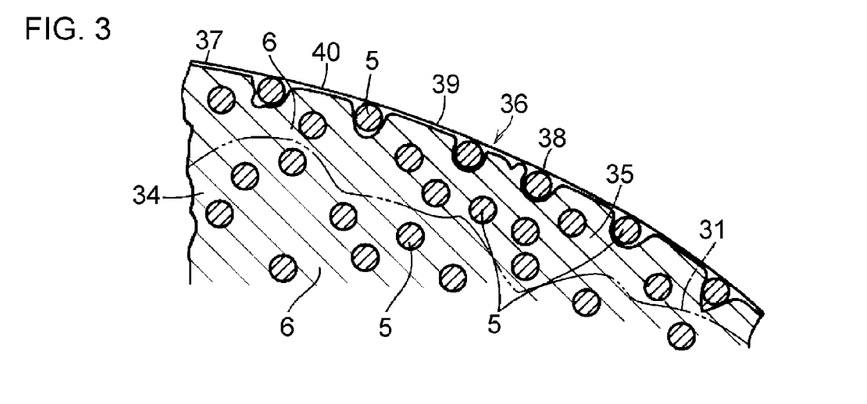
FIG. 3 is a partially enlarged explanatory view of the spherical annular seal member shown in FIG. 1.

The spherical annular seal member 36 thus fabricated is used by being incorporated in an exhaust pipe spherical joint X shown in FIG. 1. In the exhaust pipe spherical joint X shown in FIG. 1, a flange 43 is provided uprightly on an outer peripheral surface of an upstream-side exhaust pipe 41 by leaving a pipe end portion 42, and the upstream-side exhaust pipe 41 is connected to the engine side. The spherical annular seal member 36 is fitted over the pipe end portion 42 at the cylindrical inner surface 30 defining the through hole 29, and is seated with a large-diameter side annular end face 32 thereof abutting against the flange 43. A flared portion 47, which integrally has a concave spherical surface portion 45 and a flange portion 46 continuous from the concave spherical surface portion 45 and which is formed of an Fe—Cr base stainless steel, is secured to a downstream-side exhaust pipe 44 disposed in such a manner as to oppose the upstream-side exhaust pipe 41 and is connected to the muffler side. An inner surface 48 of the concave spherical surface portion 45 is in slidable contact with the composite surface 40 in which the surface 38 constituted by the reinforcing member 5 for the outer layer and the surface 39 constituted by the solid lubricant are present in mixed form in the outer surface 37 of the outer layer 35 of the spherical annular seal member 36.

In the exhaust pipe spherical joint X shown in FIG. 1, the downstream-side exhaust pipe 44 is constantly urged resiliently toward the upstream-side exhaust pipe 41 by means of a pair of bolts 49 each having one end fixed to the flange 43 and another end arranged by being inserted in the flange portion 46 of the flared portion 47, and by means of a pair of coil springs 50 each arranged between an enlarged head portion of the bolt 49 and the flange portion 46. Further, the exhaust pipe spherical joint X is arranged such that relative angular displacement occurring between the upstream-side exhaust pipe 41 and the downstream-side exhaust pipe 44 is adapted to be allowed by sliding contact between, on the one hand, the composite surface 40 in which the surface 38 constituted by the reinforcing member 5 for the outer layer and the surface 39 constituted by the solid lubricant are present in mixed form and which serves as a sliding surface of the outer layer 35 of the spherical annular seal member 36 and, on the other hand, the inner surface 48 of the concave spherical surface portion 45 of the flared portion 47 formed at the end of the downstream-side exhaust pipe 44.

As the Fe—Cr base stainless steel for forming the flared portion 47 having the concave spherical surface portion 45, an Fe—Cr base stainless steel is used which contains 0.030% or less by mass of C, 1.00% or less by mass of Si, 1.00% or less by mass of Mn, 0.040% or less by mass of P, 0.030% or less by mass of S, 17.00 to 19.00% by mass of Cr, and 0.40 to 0.80% by mass of Ti and Nb, or an Fe—Cr base stainless steel which further contains, in addition to the above-described component composition, 0.75 to 1.50% by mass of Mo and 0.020% or less by mass of N.

EXAMPLES

Spherical Annular Seal Member (A1) and Spherical Annular Seal Member (A2) Used in Examples By using one austenitic stainless steel wire with a diameter of 0.28 mm as a fine metal wire, a hollow cylindrical knitted metal wire net whose mesh size was 4 mm long and 5 mm wide or thereabouts was fabricated and was passed between a pair of rollers, thereby preparing a belt-shaped metal wire net which was used as the reinforcing member for the spherical annular base member. As the heat-resistant material for the spherical annular base member, an expanded graphite sheet (expanded graphite sheet I) having a density of 1.12 Mg/m$^3$ and a thickness of 0.38 mm was used. After the heat-resistant material was first convoluted by a one-circumference portion, the reinforcing member for the spherical annular base member was superposed on the inner side of the heat-resistant material, and the superposed assembly was convoluted, thereby preparing a tubular base member in which the heat-resistant material was placed on the outermost periphery. In this tubular base member, widthwise opposite end portions of the heat-resistant material respectively projected from the reinforcing member for the spherical annular base member in the widthwise direction thereof.

As the heat-resistant material for the outer layer, an expanded graphite sheet similar to the above-described expanded graphite sheet I and having a density of 1.12 Mg/m$^3$ and a thickness of 0.38 mm was separately prepared, and an alumina sol was prepared in which, as hydrated alumina, boehmite (alumina monohydrate: $Al_2O_3 \cdot H_2O$) was dispersedly contained in water serving as a dispersion medium containing nitric acid acting as a deflocculant and whose hydrogen ion concentration (pH) exhibited 2. An aqueous dispersion (22.5% by mass of h-BN, 25.0% by mass of PTFE, and 2.5% by mass of boehmite), in which h-BN and PTFE were dispersedly contained in this alumina sol and which dispersedly contained as a solid content 50% by mass of a lubricating composition containing 45.0% by mass of h-BN, 50.0% by mass of PTFE, and 5.0% by mass of boehmite, was roller coated on one surface of that heat-resistant material and was dried to form on one surface of the heat-resistant material a coating layer of the solid lubricant (45.0% by mass of h-BN, 50.0% by mass of PTFE, and 5.0% by mass of boehmite) consisting of the lubricating composition, thereby fabricating a multilayer sheet composed of the heat-resistant material and the coating layer of the solid lubricant coating the one surface of this heat-resistant material.

By using one each of (1) an Fe—Cr—Ni base stainless steel wire having a diameter of 0.28 mm and containing 0.030% or less by mass of C, 1.00% or less by mass of Si, 2.00% or less by mass of Mn, 0.045% or less by mass of P, 0.030% or less by mass of S, 16.00% by mass of Cr, 12.00% by mass of Ni, and 2.00% by mass of Mo and (2) an Fe—Cr—Ni base stainless steel wire having the same diameter and containing 0.030% or less by mass of C, 1.00% or less by mass of Si, 2.00% or less by mass of Mn, 0.045% or less by mass of P, 0.030% or less by mass of S, 18.00% by mass of Cr, 15.00% by mass of Ni, and 3.00% by mass of Mo, a hollow cylindrical knitted metal wire net serving as the reinforcing member for the outer layer whose mesh size was 3.5 mm long and 2.5 mm wide or thereabouts was continuously knitted, and the multilayer sheet was continuously inserted into the interior of that hollow cylindrical knitted metal wire net. This hollow cylindrical knitted metal wire net with the multilayer sheet inserted in the interior thereof was fed, starting with the insertion start end of the multilayer sheet, into a nip between a pair of cylindrical rollers so as to be pressurized in the thicknesswise direction of the multilayer sheet, thereby deforming the hollow cylindrical knitted metal wire net into a flattened knitted metal wire net and integrating the multilayer sheet and the flattened knitted metal wire net. Thus, a flattened outer layer forming member was fabricated in which the heat-resistant material of the multilayer sheet and the coating layer of the solid lubricant formed on the surface of that heat-resistant material were filled in the meshes of the metal wire net of the reinforcing member for the outer layer, and a surface constituted by the reinforcing member for the outer layer and a surface constituted by the solid lubricant were exposed in mixed form on the surface.

The outer layer forming member, in a state in which the surface thereof where the solid lubricant was exposed was placed on the outer side, was wound around the outer peripheral surface of the aforementioned tubular base member, thereby fabricating a cylindrical preform.

This cylindrical preform was fitted over the stepped core of the die shown in FIG. 16, and was disposed in the hollow portion inside the die.

The cylindrical preform disposed in the hollow portion of the die was subjected to compression forming under a pressure of 294 N/mm$^2$ (3 tons/cm$^2$) in the direction of the core axis. Thus, a spherical annular seal member was fabricated which included: a spherical annular base member having a through hole in a central portion thereof and defined by a cylindrical inner surface and annular end faces on large- and small-diameter sides of a partially convex spherical surface; and an outer layer formed integrally on the partially convex spherical surface of the spherical annular base member.

In each of the spherical annular seal members (A1) and (A2) thus obtained, the spherical annular base member included the reinforcing member for the spherical annular base member made from the compressed knitted metal wire net which was knitted by using an austenitic stainless steel wire with a diameter of 0.28 mm and whose mesh size was 5 mm long and 4 mm wide or thereabouts, as well as the heat-resistant material constituted by the expanded graphite sheet I compressed in such a manner as to fill the meshes of the metal wire net of this reinforcing member and to be formed integrally with this reinforcing member in mixed form. The spherical annular seal member (A1) included the outer layer in which the reinforcing member, which was made from a knitted metal wire net which was knitted by using an Fe—Cr—Ni base stainless steel wire having a diameter of 0.28 mm and containing 0.030% or less by mass of C, 1.00% or less by mass of Si, 2.00% or less by mass of Mn, 0.045% or less by mass of P, 0.030% or less by mass of S, 16.00% by mass of Cr, 12.00% by mass of Ni, and 2.00% by mass of Mo and whose mesh size was 3.5 mm long and 2.5 mm wide or thereabouts, the solid lubricant consisting of a lubricating composition, and the heat-resistant material containing expanded graphite, were compressed such that the solid lubricant and the heat-resistant material were filled in the meshes of the metal wire net of the reinforcing member, and such that the outer surface thereof was formed into a composite surface in which a surface constituted by the reinforcing member and a surface constituted by the solid lubricant were exposed in mixed form. The spherical annular seal member (A2) included the outer layer in which the reinforcing member, which was made from a knitted metal wire net which was knitted by using an Fe—Cr—Ni base stainless steel wire containing 0.030% or less by mass of C, 1.00% or less by mass of Si, 2.00% or less by mass of Mn, 0.045% or less by mass of P, 0.030% or less by mass of S, 18.00% by mass of Cr, 15.00% by mass of Ni, and 3.00% by mass of Mo and whose mesh size was 3.5 mm long and 2.5 mm wide or thereabouts, the solid lubricant consisting of a lubricating composition, and the heat-resistant material containing expanded graphite, were compressed such that the solid lubricant and the heat-resistant material were filled in the meshes of the metal wire net of the reinforcing member, and such that the outer surface thereof was formed into a composite surface in which a surface constituted by the reinforcing member and a surface constituted by the solid lubricant were exposed in mixed form.

Spherical Annular Seal Member (B1) and Spherical Annular Seal Member (B2) Used in Comparative Examples A tubular base member was fabricated in the same way as in Examples described above. In this tubular base member, widthwise opposite end portions of the heat-resistant material respectively projected from the reinforcing member for the spherical annular base member in the widthwise direction thereof.

In the same way as in Examples described above, a multilayer sheet was fabricated in which a coating layer of the solid lubricant (45.0% by mass of h-BN, 50.0% by mass of PTFE, and 5.0% by mass of boehmite) was formed on one surface of the heat-resistant material.

By using one each of (1) an Fe—Cr—Ni base stainless steel wire having a diameter of 0.28 mm and containing 0.080% or less by mass of C, 1.50% or less by mass of Si, 2.00% or less by mass of Mn, 0.045% or less by mass of P, 0.030% or less by mass of S, 24.00% by mass of Cr, and 19.00% by mass of Ni and (2) an Fe—Cr—Ni base stainless steel wire having the same diameter and containing 0.080% or less by mass of C, 1.50% or less by mass of Si, 2.00% or less by mass of Mn, 0.045% or less by mass of P, 0.030% or less by mass of S, 26.00% by mass of Cr, and 22.00% by mass of Ni, a hollow cylindrical knitted metal wire net serving as the reinforcing member for the outer layer whose mesh size was 3.5 mm long and 2.5 mm wide or thereabouts was continuously knitted, and the multilayer sheet was continuously inserted into the interior of that hollow cylindrical knitted metal wire net. This hollow cylindrical knitted metal wire net with the multilayer sheet inserted in the interior thereof was fed, starting with the insertion start end of the multilayer sheet, into a nip between a pair of cylindrical rollers so as to be pressurized in the thicknesswise direction of the multilayer sheet, thereby deforming the hollow cylindrical knitted metal wire net into a flattened knitted metal wire net and integrating the multilayer sheet and the flattened knitted metal wire net. Thus, a flattened outer layer forming member was fabricated in which the heat-resistant material of the multilayer sheet and the coating layer of the solid lubricant formed on the surface of that heat-resistant material were filled in the meshes of the metal wire net of the reinforcing member for the outer layer, and a surface constituted by the reinforcing member for the outer layer and a surface constituted by the solid lubricant were exposed in mixed form on the surface.

The outer layer forming member, in a state in which the surface thereof where the solid lubricant was exposed was placed on the outer side, was wound around the outer peripheral surface of the aforementioned tubular base member, thereby fabricating a cylindrical preform. Thereafter, in the same method as that for Examples, a spherical annular seal member was fabricated which included: a spherical annular base member defined by a cylindrical inner surface and annular end faces on large- and small-diameter sides of a partially convex spherical surface; and an outer layer formed integrally on the partially convex spherical surface of the spherical annular base member.

In each of the spherical annular seal members (B1) and (B2) thus obtained, the spherical annular base member included the reinforcing member for the spherical annular base member made from the knitted metal wire net which was knitted by using an austenitic stainless steel wire with a diameter of 0.28 mm and whose mesh size was 5 mm long and 4 mm wide or thereabouts, as well as the heat-resistant material constituted by the expanded graphite sheet I compressed in such a manner as to fill the meshes of the metal wire net of this reinforcing member and to be formed integrally with this reinforcing member in mixed form. The spherical annular seal member (B1) included the outer layer in which the reinforcing member, which was made from a knitted metal wire net which was knitted by using an Fe—Cr—Ni base stainless steel wire having a diameter of 0.28 mm and containing 0.080% or less by mass of C, 1.50% or less by mass of Si, 2.00% or less by mass of Mn, 0.045% or less by mass of P, 0.030% or less by mass of S, 24.00% by mass of Cr, and 19.00% by mass of Ni and whose mesh size was 3.5 mm long and 2.5 mm wide or thereabouts, the solid lubricant consisting of a lubricating composition, and the heat-resistant material containing expanded graphite, were compressed such that the solid lubricant and the heat-resistant material were filled in the meshes of the metal wire net of the reinforcing member, and such that the outer surface thereof was formed into a composite surface in which a surface constituted by the reinforcing member and a surface constituted by the solid lubricant were exposed in mixed form. The spherical annular seal member (B2) included the outer layer in which the reinforcing member, which was made from a knitted metal wire net which was knitted by using an Fe—Cr—Ni base stainless steel wire containing 0.080% or less by mass of C, 1.50% or less by mass of Si, 2.00% or less by mass of Mn, 0.045% or less by mass of P, 0.030% or less by mass of S, 26.00% by mass of Cr, and 22.00% by mass of Ni and whose mesh size was 3.5 mm long and 2.5 mm wide or thereabouts, the solid lubricant consisting of a lubricating composition, and the heat-resistant material containing expanded graphite, were compressed such that the solid lubricant and the heat-resistant material were filled in the meshes of the metal wire net of the reinforcing member, and such that the outer surface thereof was formed into a composite surface in which a surface constituted by the reinforcing member and a surface constituted by the solid lubricant were exposed in mixed form.

Next, a description will be given of the results of tests conducted on the surface roughness of the mating member, the amount of gas leakage, and the presence or absence of generation of abnormal frictional noise by incorporating each of the spherical annular seal members (A1) and (A2) and the spherical annular seal members (B1) and (B2) described above into the exhaust pipe spherical joint shown in FIG. 1.

<Test Conditions on Surface Roughness>

Pressing force using coil springs (spring set force): 590 N

Excitation amplitude: ±2°

Excitation frequency: 25 Hz

Temperature (outer surface temperature of the concave spherical surface portion 45 shown in FIG. 1): 300° C.

Excitation time: 42 Hr

No. of excitations: 3,740,000 excitations

Mating member (material of the concave spherical surface portion 45 shown in FIG. 1):

α: An Fe—Cr base stainless steel containing 0.030% or less by mass of C, 1.00% or less by mass of Si, 1.00% or less by mass of Mn, 0.040% or less by mass of P, 0.030% or less by mass of S, 18.00% by mass of Cr, and 0.40% by mass of Ti and Nb β: An Fe—Cr base stainless steel containing 0.025% or less by mass of C, 0.60% or less by mass of Si, 0.50% or less by mass of Mn, 0.040% or less by mass of P, 0.020% or less by mass of S, 18.00% by mass of Cr, 0.40% by mass of Ti and Nb, 0.75% by mass of Mo, and 0.020% or less by mass of N γ: An Fe—Cr base stainless steel containing 0.020% or less by mass of C, 0.80% or less by mass of Si, 0.50% or less by mass of Mn, 0.040% or less by mass of P, 0.010% or less by mass of S, 14.00% by mass of Cr, and 0.50% by mass of Nb <Test Method>

The upstream-side exhaust pipe in the exhaust pipe spherical joint shown in FIG. 1 is fixed, the downstream-side exhaust pipe is excited under the above-described test conditions, and the surface roughness (μm) of the surface of the mating member after the test (after completion of 3,740,000 excitations) is measured.

<Measurement Method of Gas Leakage Amount>

After the completion of the above-described surface roughness test, an opening portion of one exhaust pipe of the exhaust pipe spherical joint shown in FIG. 1 was closed, and dry air was allowed to flow in from the other exhaust pipe side under a pressure of 0.049 MPa (0.5 kgf/cm$^2$). The amount of gas leakage (litter/minute (1/min)) from the joint portion (sliding contact portions between the outer surface of the spherical annular seal member and the inner surface of the concave spherical surface portion of the flared portion, fitting portions between the cylindrical inner surface of the spherical annular seal member and the pipe end portion of the exhaust pipe, and abutting portions between the annular end face and the flange provided uprightly on the exhaust pipe) was measured by means of a flowmeter.

Table 1 shows the results of the above-described tests.

TABLE 1

| Spherical annular seal member | | Mating member | | |
|---|---|---|---|---|
| | | α | β | γ |
| (A1) | Surface roughness | 35 μm | 26 μm | * |
| | Gas leakage (l/min) | 1.6 | 1.3 | — |
| (A2) | Surface roughness | 36 μm | 25 μm | * |
| | Gas leakage (l/min) | 1.7 | 1.3 | — |
| (B1) | Surface roughness | 63 μm | 56 μm | 100 μm |
| | Gas leakage (l/min) | 3.4 | 3.0 | 6.0 |
| (B2) | Surface roughness | 66 μm | 62 μm | 105 μm |
| | Gas leakage (l/min) | 3.7 | 3.2 | 6.8 |

The mark (*) in Table 1 indicates that the wear of the reinforcing member made from the metal wire net exposed on the outer surface of the outer layer of each of the spherical annular seal member (A1) and the spherical annular seal member (A2) was considerable, and that the combination between a respective one of the spherical annular seal member (A1) and the spherical annular seal member (A2) and the mating member γ was not good, and therefore the surface roughness of the mating member was not measured.

Next, a test was conducted on the presence or absence of abnormal frictional noise in the combination between the spherical annular seal member and the mating member after the above-described test.

<Test Conditions on Presence or Absence of Generation of Abnormal Frictional Noise and Test Method>
<Test Conditions>

Pressing force using coil springs (spring set load: surface pressure): 590 N
Oscillation angle: ±0.25 to 2.5 mm
Excitation frequency: 22 Hz
Temperature (outer surface temperature of the concave spherical surface portion 45 of the exhaust pipe spherical joint shown in FIG. 1): from room temperature (25° C.) to 400° C.

<Test Method and Evaluation Method>

At respective temperatures when the outer surface temperature of the concave spherical surface portion 45 of the exhaust pipe spherical joint shown in FIG. 1 is raised from room temperature (25° C.) to 200° C., 300° C., and 400° C., respectively, and after being raised, is lowered from 400° C., to 300° C., 200° C., and room temperature, respectively, excitation is carried out at an oscillation angle of from ±0.25 to ±2.5°, and the presence or absence of abnormal frictional noise at each time is measured. The evaluation of the presence or absence of the generation of abnormal frictional noise is conducted by using the following judgment levels.

<Judgment Levels of Abnormal Frictional Noise>

Code 0: No abnormal frictional noise is generated.

Code 0.5: The generation of abnormal frictional noise can be confirmed by a sound collection pipe.

Code 1: The generation of abnormal frictional noise can be confirmed at a position approx. 0.2 m away from the sliding portion of the exhaust pipe spherical joint.

Code 1.5: The generation of abnormal frictional noise can be confirmed at a position approx. 0.5 m away from the sliding portion of the exhaust pipe spherical joint.

Code 2: The generation of abnormal frictional noise can be confirmed at a position approx. 1 m away from the sliding portion of the exhaust pipe spherical joint.

Code 2.5: The generation of abnormal frictional noise can be confirmed at a position approx. 2 m away from the sliding portion of the exhaust pipe spherical joint.

Code 3: The generation of abnormal frictional noise can be confirmed at a position approx. 3 m away from the sliding portion of the exhaust pipe spherical joint.

Code 3.5: The generation of abnormal frictional noise can be confirmed at a position approx. 5 m away from the sliding portion of the exhaust pipe spherical joint.

Code 4: The generation of abnormal frictional noise can be confirmed at a position approx. 10 m away from the sliding portion of the exhaust pipe spherical joint.

Code 4.5: The generation of abnormal frictional noise can be confirmed at a position approx. 15 m away from the sliding portion of the exhaust pipe spherical joint.

Code 5: The generation of abnormal frictional noise can be confirmed at a position approx. 20 m away from the sliding portion of the exhaust pipe spherical joint.

In the overall assessment of the above-described determination levels, with respect to Codes 0 to 2.5 a determination was made that no abnormal frictional noise was generated (accepted), whereas with respect to Codes 3 to 5 a determination was made that abnormal frictional noise was generated (rejected).

Tables 2 to 8 show the results of the above-described test.

TABLE 2

<Combination between Spherical Annular Seal Member (A1) and Mating Member α>

| | Outer surface temperature of mating member (concave spherical surface portion 45 of exhaust pipe spherical joint shown in FIG. 1) | | | | | | | |
|---|---|---|---|---|---|---|---|---|
| | | Temperature rise | | | Temperature drop | | | |
| Oscillation angle (±°) | Room temp. | 200 | 300 | 400 | 400 | 300 | 200 | Room temp. |
| 0.25 | 0.5 | 1 | 1 | 2 | 1 | 1 | 1 | 1 |
| 0.50 | 1 | 1 | 1.5 | 2 | 1.5 | 1 | 1 | 1 |
| 0.75 | 1 | 1.5 | 2 | 2 | 1.5 | 1.5 | 1.5 | 1 |
| 1.00 | 0.5 | 1.5 | 2 | 2 | 1.5 | 1.5 | 1.5 | 1 |
| 1.25 | 0.5 | 1.5 | 2 | 2 | 1.5 | 1.5 | 1 | 0.5 |
| 1.50 | 0.5 | 1.5 | 2 | 2 | 1 | 1.5 | 1.5 | 0 |
| 1.75 | 0.5 | 1.5 | 2 | 1.5 | 1 | 1.5 | 1.5 | 0 |
| 2.00 | 0.5 | 1 | 1.5 | 1.5 | 1.5 | 1 | 1.5 | 0.5 |
| 2.25 | 0.5 | 1 | 1.5 | 1 | 1.5 | 1.5 | 2 | 0 |
| 2.50 | 0.5 | 1 | 1.5 | 1 | 1.5 | 1.5 | 2 | 0 |

TABLE 3

<Combination between Spherical Annular Seal Member (A1) and Mating Member β>

Outer surface temperature of mating member (concave spherical surface portion 45 of exhaust pipe spherical joint shown in FIG. 1)

| Oscillation angle (±°) | Temperature rise | | | | Temperature drop | | | |
|---|---|---|---|---|---|---|---|---|
| | Room temp. | 200 | 300 | 400 | 400 | 300 | 200 | Room temp. |
| 0.25 | 0.5 | 1 | 1 | 0.5 | 0.5 | 0.5 | 0.5 | 0.5 |
| 0.50 | 0.5 | 1 | 1.5 | 1.5 | 1.5 | 1.5 | 1.5 | 1 |
| 0.75 | 0.5 | 1 | 2 | 1.5 | 1.5 | 1.5 | 1.5 | 1 |
| 1.00 | 0.5 | 1 | 2 | 0.5 | 0.5 | 0.5 | 0.5 | 0 |
| 1.25 | 0.5 | 0.5 | 1 | 0.5 | 0.5 | 0.5 | 0.5 | 0 |
| 1.50 | 0.5 | 0.5 | 1 | 0.5 | 0.5 | 0.5 | 0.5 | 0 |
| 1.75 | 0.5 | 0.5 | 1 | 0.5 | 0.5 | 0.5 | 0.5 | 0.5 |
| 2.00 | 0.5 | 0.5 | 1 | 0.5 | 0.5 | 0.5 | 0.5 | 0.5 |
| 2.25 | 0.5 | 0.5 | 1 | 0.5 | 0.5 | 0.5 | 0.5 | 0.5 |
| 2.50 | 0.5 | 0.5 | 1 | 0.5 | 0.5 | 0.5 | 0.5 | 0.5 |

TABLE 4

<Combination between Spherical Annular Seal Member (A2) and Mating Member α>

Outer surface temperature of mating member (concave spherical surface portion 45 of exhaust pipe spherical joint shown in FIG. 1)

| Oscillation angle (±°) | Temperature rise | | | | Temperature drop | | | |
|---|---|---|---|---|---|---|---|---|
| | Room temp. | 200 | 300 | 400 | 400 | 300 | 200 | Room temp. |
| 0.25 | 0.5 | 1 | 1 | 2 | 1 | 1 | 1 | 1 |
| 0.50 | 1 | 1 | 1.5 | 2 | 1 | 1 | 1 | 1 |
| 0.75 | 1 | 1.5 | 2 | 2 | 1 | 1.5 | 1.5 | 1 |
| 1.00 | 0.5 | 1.5 | 2 | 2 | 1 | 1.5 | 1.5 | 1 |
| 1.25 | 0.5 | 1.5 | 2 | 2 | 1 | 1.5 | 1 | 0.5 |
| 1.50 | 0.5 | 1.5 | 2 | 2 | 1 | 1.5 | 1.5 | 0 |
| 1.75 | 0.5 | 1.5 | 2 | 1.5 | 1 | 1.5 | 1.5 | 0 |
| 2.00 | 0.5 | 1 | 1.5 | 1.5 | 1.5 | 1 | 1.5 | 0.5 |
| 2.25 | 0.5 | 1 | 1.5 | 1 | 1.5 | 1.5 | 1 | 0 |
| 2.50 | 0.5 | 1 | 1.5 | 1 | 1.5 | 1.5 | 1 | 0 |

TABLE 5

<Combination between Spherical Annular Seal Member (A2) and Mating Member β>

Outer surface temperature of mating member (concave spherical surface portion 45 of exhaust pipe spherical joint shown in FIG. 1)

| Oscillation angle (±°) | Temperature rise | | | | Temperature drop | | | |
|---|---|---|---|---|---|---|---|---|
| | Room temp. | 200 | 300 | 400 | 400 | 300 | 200 | Room temp. |
| 0.25 | 0.5 | 1 | 1 | 0.5 | 0.5 | 0.5 | 0.5 | 0.5 |
| 0.50 | 0.5 | 1 | 1.5 | 1.5 | 1.5 | 1.5 | 1.5 | 1 |
| 0.75 | 0.5 | 1 | 2 | 1.5 | 1.5 | 1.5 | 1.5 | 1 |
| 1.00 | 0.5 | 1 | 1.5 | 1 | 0.5 | 0.5 | 0.5 | 0 |
| 1.25 | 0.5 | 0.5 | 1.5 | 1 | 0.5 | 0.5 | 0.5 | 0 |
| 1.50 | 0.5 | 0.5 | 1 | 1 | 0.5 | 0.5 | 0.5 | 0 |
| 1.75 | 0.5 | 0.5 | 1 | 0.5 | 0.5 | 0.5 | 0.5 | 0.5 |
| 2.00 | 0.5 | 0.5 | 1 | 0.5 | 0.5 | 0.5 | 0.5 | 0.5 |
| 2.25 | 0.5 | 0.5 | 1 | 0.5 | 0.5 | 0.5 | 0.5 | 0 |
| 2.50 | 0.5 | 0.5 | 1 | 0.5 | 0.5 | 0.5 | 0.5 | 0 |

TABLE 6

<Combination between Spherical Annular Seal Member (B1) and Mating Member α>

Outer surface temperature of mating member (concave spherical surface portion 45 of exhaust pipe spherical joint shown in FIG. 1)

| Oscillation angle (±°) | Temperature rise | | | | Temperature drop | | | |
|---|---|---|---|---|---|---|---|---|
| | Room temp. | 200 | 300 | 400 | 400 | 300 | 200 | Room temp. |
| 0.25 | 1 | 1 | 1 | 1 | 1 | 1 | 1 | 1 |
| 0.50 | 1.5 | 1.5 | 1.5 | 1.5 | 2 | 1.5 | 2 | 1.5 |
| 0.75 | 2 | 1.5 | 2 | 2.5 | 2.5 | 2 | 2.5 | 2 |
| 1.00 | 2 | 2 | 2.5 | 2.5 | 2.5 | 2 | 2.5 | 2 |
| 1.25 | 2 | 2 | 2.5 | 2.5 | 3 | 2.5 | 2.5 | 2 |
| 1.50 | 2 | 2 | 2.5 | 2.5 | 3 | 2.5 | 2.5 | 2 |
| 1.75 | 2.5 | 2 | 2.5 | 2.5 | 2.5 | 2.5 | 3 | 2.5 |
| 2.00 | 2.5 | 2 | 2.5 | 3.0 | 3 | 2.5 | 2.5 | 2.5 |
| 2.25 | 2.5 | 2 | 2.5 | 2.5 | 3 | 2.5 | 2.5 | 2.5 |
| 2.50 | 2.5 | 2 | 2.5 | 3.0 | 2.5 | 2.5 | 2.5 | 2.5 |

TABLE 7

<Combination between Spherical Annular Seal Member (B1) and Mating Member γ>

Outer surface temperature of mating member (concave spherical surface portion 45 of exhaust pipe spherical joint shown in FIG. 1)

| Oscillation angle (±°) | Temperature rise | | | | Temperature drop | | | |
|---|---|---|---|---|---|---|---|---|
| | Room temp. | 200 | 300 | 400 | 400 | 300 | 200 | Room temp. |
| 0.25 | 1 | 1 | 1 | 1 | 1 | 1 | 0.5 | 1 |
| 0.50 | 1.5 | 1.5 | 1.5 | 1.5 | 2 | 1.5 | 2 | 1.5 |
| 0.75 | 2 | 1.5 | 2 | 2.5 | 2.5 | 2 | 2.5 | 2 |
| 1.00 | 2 | 2 | 2.5 | 2.5 | 3 | 2 | 3 | 2 |
| 1.25 | 2 | 2 | 2.5 | 2.5 | 3 | 2.5 | 2.5 | 2 |
| 1.50 | 2 | 2 | 2.5 | 2.5 | 3 | 2.5 | 2.5 | 2 |
| 1.75 | 2 | 2 | 2.5 | 2.5 | 3 | 2.5 | 3 | 2 |
| 2.00 | 2 | 2 | 2.5 | 2.5 | 3 | 2.5 | 3 | 2 |
| 2.25 | 2 | 2 | 2.5 | 2.5 | 3 | 2.5 | 2.5 | 2 |
| 2.50 | 2 | 2 | 2.5 | 2.5 | 2.5 | 2.5 | 2.5 | 2 |

TABLE 8

<Combination between Spherical Annular Seal Member (B2) and Mating Member γ>

Outer surface temperature of mating member (concave spherical surface portion 45 of exhaust pipe spherical joint shown in FIG. 1)

| Oscillation angle (±°) | Temperature rise | | | | Temperature drop | | | |
|---|---|---|---|---|---|---|---|---|
| | Room temp. | 200 | 300 | 400 | 400 | 300 | 200 | Room temp. |
| 0.25 | 1 | 1 | 1 | 1 | 1 | 1 | 0.5 | 1 |
| 0.50 | 1.5 | 1.5 | 1.5 | 1.5 | 2 | 1.5 | 2 | 1.5 |
| 0.75 | 2 | 1.5 | 2 | 2.5 | 2.5 | 2 | 2.5 | 2 |
| 1.00 | 2 | 2 | 2.5 | 3 | 3 | 2 | 3 | 2 |
| 1.25 | 2 | 2 | 2.5 | 2.5 | 3 | 2.5 | 2.5 | 2 |
| 1.50 | 2 | 2 | 2.5 | 3 | 3 | 2.5 | 2.5 | 2 |
| 1.75 | 2 | 2 | 2.5 | 2.5 | 3 | 2.5 | 3 | 2 |
| 2.00 | 2 | 2.5 | 2.5 | 3 | 2.5 | 2.5 | 3 | 3 |
| 2.25 | 2 | 2.5 | 2.5 | 3 | 2.5 | 2.5 | 3 | 3 |
| 2.50 | 2 | 2.5 | 2.5 | 3 | 2.5 | 2.5 | 3 | 3 |

From the test results shown in Tables 1 to 8, it can be appreciated that, in the combination between each of the spherical annular seal member (A1) and the spherical annular seal member (A2) and the mating member α or the mating member β, it is possible to prevent causing damage to the mating member as practically as possible, and that in the generation of abnormal frictional noise after the test these combinations exhibited determination level 2 or below of acceptance and are hence extremely favorable combinations, whereas, in the combination between each of the spherical annular seal member (B1) and the spherical annular seal member (B2) and the mating member α, β, or γ, particularly in the combination with the mating member γ, the damage of the mating member was intense, and in the generation of abnormal frictional noise these combinations recorded determination level 3 of rejection and are combinations which should be avoided as practically as possible.

As described above, in the exhaust pipe spherical joint in accordance with the present invention, it is possible to suppress the generation of abnormal frictional noise, prevent as practically as possible causing damage to the surface of the mating member such as dents and indentations even in the sliding friction between the mating member and the discontinuous surface of the reinforcing member made from the metal wire net exposed on the outer surface of the outer layer of the spherical annular seal member, and smoothly allow relative angular displacement occurring in the exhaust pipe.

DESCRIPTION OF REFERENCE NUMERALS

1: knitted metal wire net
4: belt-shaped metal wire net
5: reinforcing member
6: heat-resistant material
34: spherical annular base member
35: outer layer
36: spherical annular seal member
37: outer surface
40: composite surface

The invention claimed is:

1. An exhaust pipe spherical joint in which a spherical annular seal member is fitted and fixed to an outer peripheral surface of an upstream-side exhaust pipe connected to an engine side, said spherical annular seal member including a spherical annular base member defined by a cylindrical inner surface, a partially convex spherical surface, and annular end faces on large- and small-diameter sides of the partially convex spherical surface, and an outer layer which is formed integrally on the partially convex spherical surface of said spherical annular base member and in which a heat-resistant material containing expanded graphite, a solid lubricant, and a reinforcing member made from a metal wire net are compressed such that the solid lubricant and the heat-resistant material are filled in meshes of the metal wire net of the reinforcing member and the solid lubricant, the heat-resistant material, and the reinforcing member are integrated in mixed form, an outer surface in said outer layer of said spherical annular seal member in which a surface constituted by the reinforcing member and a surface constituted by the solid lubricant are exposed in mixed form being disposed in such a manner as to oppose the upstream-side exhaust pipe and being in slidable contact with an inner surface of a concave spherical surface portion of a flared portion of a downstream-side exhaust pipe connected to a muffler side, relative angular displacement occurring between the upstream-side exhaust pipe and the downstream-side exhaust pipe being adapted to be allowed by sliding contact between the outer surface of said outer layer and the inner surface of the concave spherical surface portion, wherein:

the reinforcing member made from the metal wire net exposed on the outer surface of said outer layer of said spherical annular seal member is formed of an Fe—Cr—Ni base stainless steel wire containing at least 16.00 to 18.00% by mass of Cr and 12.00 to 15.00% by mass of Ni, and the concave spherical surface which is brought into slidable contact with the outer surface is formed of an Fe—Cr base stainless steel containing at least 17.00 to 19.00% by mass of Cr, wherein the reinforcing member made from the metal wire net exposed on the outer surface of said outer layer of said spherical annular seal member further contains 0.030% or less by mass of C, 1.00% or less by mass of Si, 2.00% or less by mass of Mn, 0.045% or less by mass of P, 0.030% or less by mass of S, and 2.00 to 3.00% by mass of Mo, and wherein the concave spherical surface portion of the flared portion of the downstream-side exhaust pipe further contains 0.030% or less by mass of C, 1.00% or less by mass of Si, 1.00% or less by mass of Mn, 0.040% or less by mass of P, 0.030% or less by mass of S, and 0.40 to 0.80% by mass of Ti and Nb.

2. The exhaust pipe spherical joint according to claim 1, wherein the concave spherical surface portion of the flared portion of the downstream-side exhaust pipe further contains 0.75 to 1.50% by mass of Mo and 0.020% or less by mass of N.

3. The exhaust pipe spherical joint according to claim 1, wherein the solid lubricant exposed on the outer surface of said outer layer of said spherical annular seal member contains 23 to 57% by mass of a hexagonal boron nitride, 5 to 15% by mass of hydrated alumina, and 33 to 67% by mass of a polytetrafluoroethylene resin.

4. The exhaust pipe spherical joint according to claim 1, wherein said spherical annular base member includes a reinforcing member made from a metal wire net and a heat-resistant material containing expanded graphite and compressed in such a manner as to be integrated with the reinforcing member in mixed form.

5. The exhaust pipe spherical joint according to claim 4, wherein each of the heat-resistant materials of said spherical annular base member and said outer layer further contains 1.0 to 16.0% by mass of a phosphate.

6. The exhaust pipe spherical joint according to claim 5, wherein each of the heat-resistant materials of said spherical annular base member and said outer layer further contains 0.05 to 5.0% by mass of a phosphoric acid.

* * * * *